United States Patent
Ramaswamy

(10) Patent No.: US 12,507,120 B2
(45) Date of Patent: Dec. 23, 2025

(54) HETEROGENEOUS HUB CLUSTERING AND APPLICATION POLICY BASED AUTOMATIC NODE SELECTION FOR NETWORK OF CLOUDS

(71) Applicant: VeloCloud Networks, LLC, Santa Clara, CA (US)

(72) Inventor: Navaneeth Krishnan Ramaswamy, Chennai (IN)

(73) Assignee: VeloCloud Networks, LLC, Santa Clara, CA (US)

( * ) Notice: Subject to any disclaimer, the term of this patent is extended or adjusted under 35 U.S.C. 154(b) by 388 days.

(21) Appl. No.: 18/096,001

(22) Filed: Jan. 11, 2023

(65) Prior Publication Data

US 2023/0224759 A1     Jul. 13, 2023

(30) Foreign Application Priority Data

Jan. 12, 2022 (IN) .............................. 202241001737

(51) Int. Cl.
*H04W 28/08*     (2023.01)
*H04W 28/02*     (2009.01)

(52) U.S. Cl.
CPC ..... *H04W 28/0925* (2020.05); *H04W 28/021* (2013.01); *H04W 28/0883* (2020.05)

(58) Field of Classification Search
CPC ........... H04W 28/0925; H04W 28/021; H04W 28/0883; H04L 45/04; H04L 45/64
See application file for complete search history.

(56) References Cited

U.S. PATENT DOCUMENTS

| | | | |
|---|---|---|---|
| 5,652,751 | A | 7/1997 | Sharony |
| 5,909,553 | A | 6/1999 | Campbell et al. |
| 6,154,465 | A | 11/2000 | Pickett |
| 6,157,648 | A | 12/2000 | Voit et al. |

(Continued)

FOREIGN PATENT DOCUMENTS

| | | |
|---|---|---|
| CN | 1483270 A | 3/2004 |
| CN | 1926809 A | 3/2007 |

(Continued)

OTHER PUBLICATIONS

Non-Published Commonly Owned U.S. Appl. No. 18/222,864, filed Jul. 17, 2023, 350 pages, VMware, Inc.

(Continued)

*Primary Examiner* — Jung H Park
(74) *Attorney, Agent, or Firm* — BainwoodHuang

(57) ABSTRACT

Some embodiments provide a method of transmitting data in a logical network with multiple branches and a hub cluster with multiple hubs of a first category of hubs and multiple hubs of a second category of hubs. The method, for each of the multiple branches (1) assigns a first hub of the first category of hubs to the branch (2) assigns a second hub of the second category of hubs to the branch, and (3) provides a set of application based policies to the branch. The application based policies direct the branch to route different types of network traffic of the application through the first hub than through the second hub. Each hub of the first category of hubs, in some embodiments, includes a set of resources equivalent to a set of resources of each other hub of the first category of hubs.

19 Claims, 9 Drawing Sheets

(56) References Cited

U.S. PATENT DOCUMENTS

| | | |
|---|---|---|
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,051,185 B2 | 11/2011 | Lee et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin, III et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,769,129 B2 | 7/2014 | Watsen et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,019,837 B2 | 4/2015 | Lue et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B1 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,263,848 B2 | 4/2019 | Wolting |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,382 B2 | 7/2020 | Guan et al. |

(56) References Cited

U.S. PATENT DOCUMENTS

| | | | |
|---|---|---|---|
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,924,388 B1 | 2/2021 | Burns et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 * | 7/2022 | Kumar ............... H04L 41/0897 |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0161321 A1 | 8/2003 | Karam et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |

(56) References Cited

U.S. PATENT DOCUMENTS

| | | |
|---|---|---|
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0098092 A1 | 4/2010 | Luo et al. |
| 2010/0100768 A1 | 4/2010 | Yamamoto et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Udlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Mai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128757 A1 | 5/2013 | Chowdhary et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0258939 A1 | 10/2013 | Wang |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Mn et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |

(56) References Cited

U.S. PATENT DOCUMENTS

| | | |
|---|---|---|
| 2014/0226664 A1 | 8/2014 | Chen et al. |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0351394 A1 | 11/2014 | Elisha |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |

(56) References Cited

U.S. PATENT DOCUMENTS

| | | |
|---|---|---|
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0085628 A1* | 3/2017 | Mahindra ............ H04L 41/40 |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0041470 A1 | 2/2018 | Schultz et al. |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Ku |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |

(56) References Cited

U.S. PATENT DOCUMENTS

| | | |
|---|---|---|
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Mgit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |

(56) References Cited

U.S. PATENT DOCUMENTS

| | | |
|---|---|---|
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0392171 A1 | 12/2021 | Srinivas et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerstrom et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0121871 A1 | 4/2023 | Mayya et al. |
| 2023/0134539 A1* | 5/2023 | Wang .................. H04L 41/147 709/223 |
| 2023/0164158 A1 | 5/2023 | Fellows et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |
| 2023/0308421 A1 | 9/2023 | Mayya et al. |

FOREIGN PATENT DOCUMENTS

| | | |
|---|---|---|
| CN | 102577270 A | 7/2012 |
| CN | 102811165 A | 12/2012 |
| CN | 104205757 A | 12/2014 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1031224 B1 | 3/2005 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| KR | 20170058201 A | 5/2017 |
| NO | 2020101922 A1 | 5/2020 |
| RU | 2574350 C2 | 2/2016 |
| WO | 2000078004 A2 | 12/2000 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020112345 A1 | 6/2020 |
| WO | 2021040934 A1 | 3/2021 |

(56) References Cited

FOREIGN PATENT DOCUMENTS

| | | |
|---|---|---|
| WO | 2021118717 A1 | 6/2021 |
| WO | 2021150465 A1 | 7/2021 |
| WO | 2021211906 A1 | 10/2021 |
| WO | 2022005607 A1 | 1/2022 |
| WO | 2022082680 A1 | 4/2022 |
| WO | 2022154850 A1 | 7/2022 |
| WO | 2022159156 A1 | 7/2022 |
| WO | 2022231668 A1 | 11/2022 |
| WO | 2022235303 A1 | 11/2022 |
| WO | 2022265681 A1 | 12/2022 |
| WO | 2023009159 A1 | 2/2023 |

OTHER PUBLICATIONS

Non-Published Commonly Owned U.S. Appl. No. 18/222,868, filed Jul. 17, 2023, 22 pages, VMware, Inc.

Non-Published Commonly Owned U.S. Appl. No. 18/224,466, filed Jul. 20, 2023, 56 pages, VMware, Inc.

Non-Published Commonly Owned U.S. Appl. No. 18/235,879, filed Aug. 20, 2023, 173 pages, VMware, Inc.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Non-Published Commonly Owned U.S. Appl. No. 18/137,584, filed Apr. 21, 2023, 57 pages, VMware, Inc.

Non-Published Commonly Owned U.S. Appl. No. 18/197,090, filed May 14, 2023, 36 pages, Nicira, Inc.

Non-Published Commonly Owned U.S. Appl. No. 18/211,568, filed Jun. 19, 2023, 37 pages, VMware, Inc.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/574,225, filed Jan. 12, 2022, 56 pages, VMware, Inc.

Non-Published Commonly Owned U.S. Appl. No. 17/574,236, filed Jan. 12, 2022, 54 pages, VMware, Inc.

Non-Published Commonly Owned U.S. Appl. No. 17/695,264, filed Mar. 15, 2022, 28 pages, VMware, Inc.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/966,814, filed Oct. 15, 2022, 176 pages, VMware, Inc.

Non-Published Commonly Owned U.S. Appl. No. 17/966,820, filed Oct. 15, 2022, 26 pages, VMware, Inc.

Non-Published Commonly Owned U.S. Appl. No. 17/976,717, filed Oct. 28, 2022, 37 pages, VMware, Inc.

Non-Published Commonly Owned U.S. Appl. No. 18/083,536, filed Dec. 18, 2022, 27 pages, VMware, Inc.

Non-Published Commonly Owned U.S. Appl. No. 18/088,554, filed Dec. 24, 2022, 34 pages, VMware, Inc.

Non-Published Commonly Owned U.S. Appl. No. 18/088,555, filed Dec. 24, 2022, 35 pages, VMware, Inc.

Non-Published Commonly Owned U.S. Appl. No. 18/088,556, filed Dec. 24, 2022, 27 pages, VMware, Inc.

Non-Published Commonly Owned U.S. Appl. No. 18/102,685, filed Jan. 28, 2023, 124 pages, VMware, Inc.

Non-Published Commonly Owned U.S. Appl. No. 18/102,687, filed Jan. 28, 2023, 172 pages, VMware, Inc.

Non-Published Commonly Owned U.S. Appl. No. 18/102,688, filed Jan. 28, 2023, 49 pages, VMware, Inc.

(56) References Cited

OTHER PUBLICATIONS

Non-Published Commonly Owned U.S. Appl. No. 18/102,689, filed Jan. 28, 2023, 46 pages, VMware, Inc.

Non-Published Commonly Owned U.S. Appl. No. 15/803,964, filed Nov. 6, 2017, 15 bages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks, " 2022 IEEE 12th Annual Computing and Communication Workshop and Conference, Jan. 26-29, 2022, 6 pages, IEEE, Las Vegas, NV, USA.

\* cited by examiner

HETEROGENEOUS HUB CLUSTERING AND APPLICATION POLICY BASED AUTOMATIC NODE SELECTION FOR NETWORK OF CLOUDS

In recent years, several companies have brought to market solutions for deploying software-defined (SD) wide-area networks (WANs) for enterprises. Some such SD-WAN solutions use external third-party private or public cloud datacenters (clouds) to define different virtual WANs for different enterprises. These solutions typically have forwarding elements including edge forwarding elements (called edge devices) and hub forwarding elements (called hubs) at SD-WAN sites of an enterprise that connect with one or more gateway forwarding elements (called gateway devices or gateways) that are deployed in the third-party clouds.

In such a deployment, an edge device connects through one or more secure connections with a gateway, with these connections traversing one or more network links that connect the edge device with an external network. Examples of such network links include MPLS links, 5G LTE links, commercial broadband Internet links (e.g., cable modem links or fiber optic links), etc. The SD-WAN sites include branch offices (called branches) of the enterprise, and these offices are often spread across several different geographic locations with network links to the gateways of various different network connectivity types. These branches connect to the hubs, in some networks, each branch connects to a hub with secure connectivity using a virtual private network (VPN) tunnel.

In the prior art, multiple hubs (sometimes called "hub nodes") could be grouped in a logical hub cluster. Some or all hubs may be physically located in a single datacenter and some or all may be located in different datacenters. Hub clustering is intended to group bunch of edges on datacenters by abstracting them into a single logical cluster in order to provide a scalable solution to enable large number of branch edges to form tunnels to the datacenters over public and/or private links. The hub clustering then enables various devices connected on the branch side to benefit from routing based on link quality, forward error correction, link aggregation with per packet load balancing etc.

However, the prior art hub clustering systems mandate a homogeneous order of resource sizing across all hub nodes in a cluster i.e., all hub nodes in a prior art hub cluster must have similar hardware or virtual edges with the same resource sizing (e.g., of CPU(s), memory, network resources, etc.). Hubs with the same resource sizing may be referred to as being in a single category of hubs within the cluster. In some prior art systems, maintaining a single category of hubs (e.g., homogeneity of resources from hub to hub) in a cluster supports the smooth re-assignment of branch nodes to different hub nodes in the hub cluster. As every hub node in a cluster of the prior art system has identical resources, any allocation of resources at one hub node would smoothly transfer over to any other hub node in the event that the original hub node became unavailable due to maintenance, network issues, etc.

However, the restriction of hub nodes to a single resources, sometimes results in over provisioning of physical devices (of the hub nodes) as well as virtual edge resources and related instances. That is, resources of a hub node may be underutilized when the hub node is assigned to a branch edge that does not require the full resources of the hub or in some cases when the hub node is assigned to multiple branch edges that collectively underutilize the hub node. This tendency toward underutilizing resources leads to sub-optimal utilization of the hub nodes while inflating the costs for a customer, who pays for resources allocated rather than resources actually utilized. Accordingly, there is a need in the art for a method that supports multiple categories of hubs (i.e., heterogeneity of resources from hub to hub) in hub clusters.

BRIEF SUMMARY

Some embodiments provide a method of transmitting data in a logical network with multiple branches and a hub cluster with multiple hubs of a first category of hubs and multiple hubs of a second category of hubs. The method, for each of the multiple branches (1) assigns a first hub of the first category of hubs to the branch (2) assigns a second hub of the second category of hubs to the branch, and (3) provides a set of application based policies to the branch. The application based policies direct the branch to route different types of network traffic of the application through the first hub than through the second hub. Each hub of the first category of hubs, in some embodiments, includes a set of resources equivalent to a set of resources of each other hub of the first category of hubs. Each hub of the second category of hubs, in some embodiments, includes a set of resources that is not equivalent to the set of resources of each hub of the first category of hubs. In some embodiments, each hub of the first category of hubs has at least one resource that is superior to a corresponding resource of hubs of the second category of hubs.

The second category of hubs, in some embodiments, includes multiple sub-categories of hubs. Each hub in a sub-category of hubs includes an equivalent set of resources to each other hub of the sub-category of hubs. The second hub may be a hub of a first sub-category and the method may further include assigning a third hub of the first category of hubs and a fourth hub of a second sub-category of hubs to a second branch.

Each hub of the second category of hubs, in some embodiments, includes a set of resources that is equivalent to a set of resources of each other hub of the second category of hubs and not equivalent to a set of resources of each hub of the first category of hubs. Sets of resources are equivalent, in some embodiments, when each set of resources includes at least an equivalent amount of processing resources and an equivalent amount of memory. Sets of resources are equivalent, in some embodiments, when each set of resources further includes at least equivalent network resource characteristics and equivalent storage capacity.

The hubs of the first category of hubs carry higher priority network traffic than the hubs of the second category of hubs, in some embodiments. An application based policy for a particular application routes at least part of the network traffic of the particular application through the second hub when the first hub is overloaded, in some embodiments. An application based policy for a particular application, in some embodiments, directs network traffic of the particular application sent from a first branch to a destination at a second branch through the second hub and directs network traffic sent from the first branch to a destination outside the logical network through the first hub. An application based policy for a particular application, in some embodiments, directs the branch to set a lower priority for sending network traffic with a subset of route prefixes through the first hub and directs the branch to set a higher priority for sending network traffic with the subset of route prefixes through the second hub. In some embodiments, providing a set of application based policies to the branch includes providing the set of application based policies to an SD-WAN edge of the branch. The assigning and providing may be performed through a cloud gateway.

The method of some embodiments transmits data in a logical network including multiple hubs in a hub cluster and multiple branches. The method, for each of the multiple branches: (1) assigns a first hub of the multiple hubs to forward data from the assigned branch to machines outside of logical network, (2) assigns a second hub of the multiple hubs to forward data from the assigned branch to other branches of the logical network. The second hub, in some embodiments, is assigned to forward data exclusively between branches of the logical network. The second hub may be assigned to forward data exclusively between the first assigned branch and a second assigned branch of the logical network. The second hub may be further assigned to forward data from other assigned branches of the logical network, but not the first assigned branch, to the machines outside of the logical network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
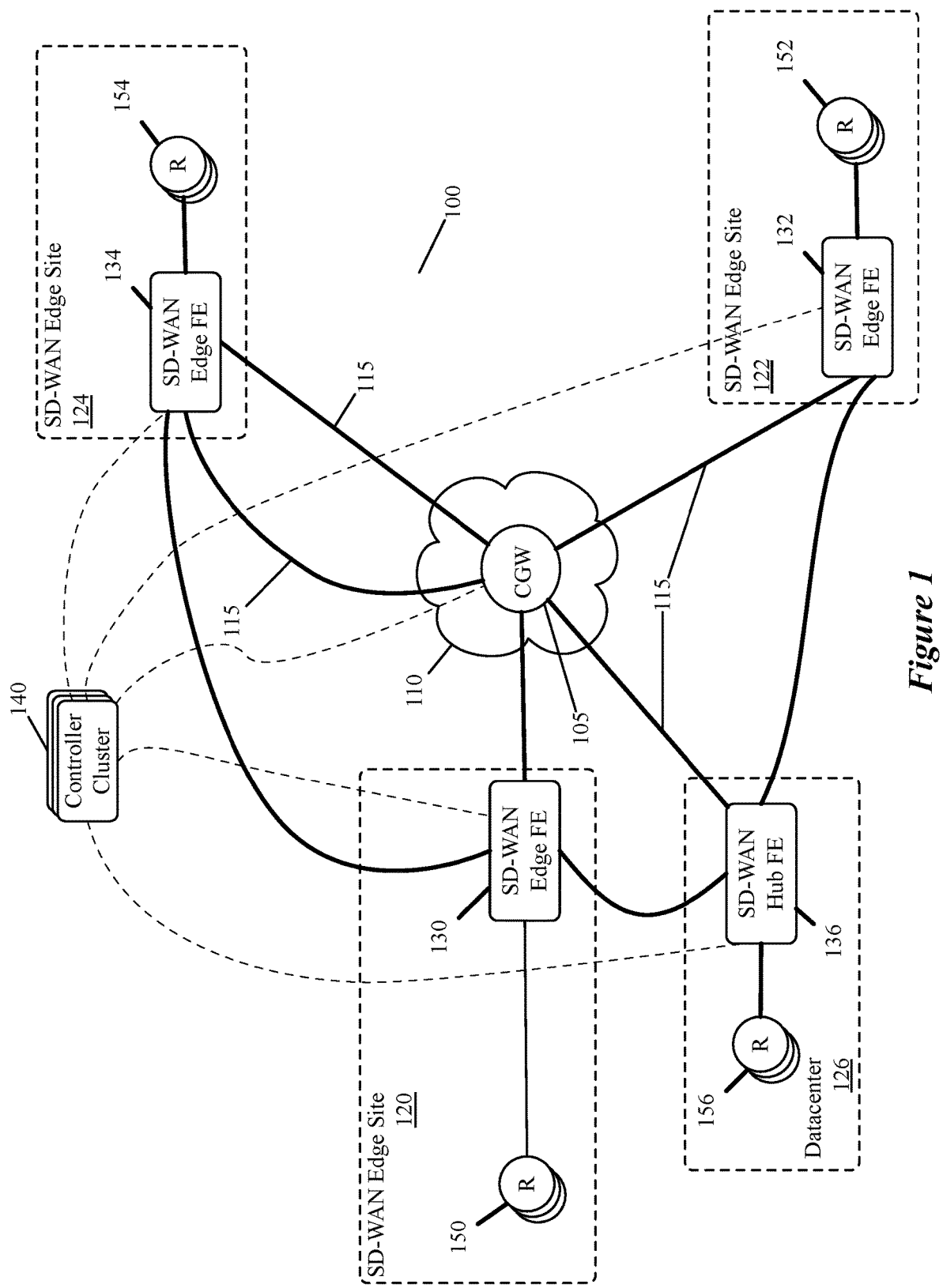
FIG. 1 illustrates an example of a virtual network that is created for a particular entity using a hub that is deployed in a public cloud datacenter of a public cloud provider.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of transmitting data in a logical network with multiple branches and a hub cluster with multiple hubs of a first category of hubs and multiple hubs of a second category of hubs. The method, for each of the multiple branches (1) assigns a first hub of the first category of hubs to the branch (2) assigns a second hub of the second category of hubs to the branch, and (3) provides a set of application based policies to the branch. The application based policies direct the branch to route different types of network traffic of the application through the first hub than through the second hub. Each hub of the first category of hubs, in some embodiments, includes a set of resources equivalent to a set of resources of each other hub of the first category of hubs. Each hub of the second category of hubs, in some embodiments, includes a set of resources that is not equivalent to the set of resources of each hub of the first category of hubs. In some embodiments, each hub of the first category of hubs has at least one resource that is superior to a corresponding resource of hubs of the second category of hubs.

The second category of hubs, in some embodiments, includes multiple sub-categories of hubs. Each hub in a sub-category of hubs includes an equivalent set of resources to each other hub of the sub-category of hubs. The second hub may be a hub of a first sub-category and the method may further include assigning a third hub of the first category of hubs and a fourth hub of a second sub-category of hubs to a second branch.

Each hub of the second category of hubs, in some embodiments, includes a set of resources that is equivalent to a set of resources of each other hub of the second category of hubs and not equivalent to a set of resources of each hub of the first category of hubs. Sets of resources are equivalent, in some embodiments, when each set of resources includes at least an equivalent amount of processing resources and an equivalent amount of memory. Sets of resources are equivalent, in some embodiments, when each set of resources further includes at least equivalent network resource characteristics and equivalent storage capacity.

The hubs of the first category of hubs carry higher priority network traffic than the hubs of the second category of hubs, in some embodiments. An application based policy for a particular application routes at least part of the network traffic of the particular application through the second hub when the first hub is overloaded, in some embodiments. An application based policy for a particular application, in some embodiments, directs network traffic of the particular application sent from a first branch to a destination at a second branch through the second hub and directs network traffic sent from the first branch to a destination outside the logical network through the first hub. An application based policy for a particular application, in some embodiments, directs the branch to set a lower priority for sending network traffic with a subset of route prefixes through the first hub and directs the branch to set a higher priority for sending network traffic with the subset of route prefixes through the second hub. In some embodiments, providing a set of application based policies to the branch includes providing the set of application based policies to an SD-WAN edge of the branch. The assigning and providing may be performed through a cloud gateway.

The method of some embodiments transmits data in a logical network including multiple hubs in a hub cluster and multiple branches. The method, for each of the multiple branches: (1) assigns a first hub of the multiple hubs to forward data from the assigned branch to machines outside of logical network, (2) assigns a second hub of the multiple hubs to forward data from the assigned branch to other branches of the logical network. The second hub, in some embodiments, is assigned to forward data exclusively between branches of the logical network. The second hub may be assigned to forward data exclusively between the first assigned branch and a second assigned branch of the logical network. The second hub may be further assigned to forward data from other assigned branches of the logical network, but not the first assigned branch, to the machines outside of the logical network.

One of ordinary skill in the art will understand that although the application based policies are described herein as directing network traffic through specific hubs, the configuration of the application based policy may not include a particular hub to route the traffic through. For example, an application based policy could direct an edge forwarding element of a branch to route a particular type of network traffic through a particular type of hub node. The edge forwarding element would then apply that directive to route that type of traffic through the particular hub node of the specified type of hub node that is assigned to the branch.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model. Network traffic refers to a set of data packets sent through a network. For example, network traffic could be sent from an application operating on a machine (e.g., a virtual machine or physical computer) on a branch of an SD-WAN through a hub node of a hub cluster of the SD-WAN.

The SD-WANs of some embodiments employ a hub and spoke architecture, in which the hubs serve as focal/intermediary points for connecting edge forwarding elements at branch sites that serve as the spokes of the SD-WAN architecture. The branches themselves may be implemented as sites to support manufacturing, Points of Sale (POS), medical facilities such as hospitals and clinics, or other scenarios. In some embodiments, hubs act as a central point of management for some or all connected branch sites. Hubs of some embodiments are set up by a centralized management plane orchestrator. The orchestrator notifies all the edge forwarding elements on the branches about the hubs, and the edge forwarding elements build secure overlay (in some embodiments, multi-path) tunnels to the hubs. The hubs themselves include edge forwarding elements, typically deployed in datacenters to allow branches to access the datacenters' resources and to route traffic within and outside the SD-WAN.

The edge forwarding elements connect to each other either directly or through a hub (meaning traffic from one branch site would go through that site's edge forwarding element to a hub forwarding element at a datacenter, and this hub forwarding element would then relay the traffic to another branch site through that site's edge forwarding element). Similarly, in some embodiments, traffic from branches passes through a hub, then out of the SD-WAN, over an external network to an external (outside the SD-WAN) machine. The edge and hub forwarding elements in some embodiments are implemented by hardware routers, by software forwarding elements (e.g., software routers) executing on computers, or by a combination of one or more hardware and software routers.

The hubs and branches mentioned above operate as parts of a virtual network. FIG. 1 illustrates an example of a virtual network 100 that is created for a particular entity using SD-WAN forwarding elements deployed at branch sites, datacenters, and public clouds. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

In FIG. 1, the SD-WAN forwarding elements include cloud gateway 105 and SD-WAN forwarding elements 130, 132, 134, and 136. The cloud gateway (CGW) in some embodiments is a forwarding element that is in a private or public datacenter 110. The CGW 105 in some embodiments has secure connection links (e.g., tunnels) with edge forwarding elements (e.g., SD-WAN edge forwarding elements (FEs) 130, 132, 134, and 136) at the particular entity's multi-machine sites (e.g., SD-WAN edge sites 120, 122, and 124), such as branch offices, datacenters, etc. These multi-machine sites are often at different physical locations (e.g., different buildings, different cities, different states, etc.) and are referred to below as multi-machine sites or nodes.

Four multi-machine sites 120-126 are illustrated in FIG. 1, with three of them being branch sites 120-124, and one being a datacenter 126. Each branch site is shown to include an edge forwarding node 130-134, while the datacenter site 126 is shown to include a hub forwarding node 136. Each branch site 120-124 and the datacenter 126 includes resources 150-156 respectively. These resources 150-156 may include servers, hosts, routers, switches, and/or other physical or logical elements (e.g., virtual machines, containers, etc.). The resources 150-156 may communicate with resources of other branches and/or other resources outside of their own site through the forwarding elements 130-136, respectively. The datacenter SD-WAN forwarding node 136 is referred to as a hub node 136 because in some embodiments this forwarding node can be used to connect (e.g., through a VPN tunnel) to other edge forwarding nodes of the branch sites 120-124. The hub node 136 in some embodiments provides services (e.g., middlebox services) for packets that it forwards from one branch site to another branch site. The hub node 136 also provides access to the datacenter resources 156, as further described below.

Each edge forwarding element (e.g., SD-WAN edge FEs 130-134) exchanges data messages with one or more cloud gateways 105 through one or more connection links 115 (e.g., multiple connection links available at the edge forwarding element). In some embodiments, these connection links include secure and unsecure connection links, while in other embodiments they only include secure connection links. As shown by edge node 134 and gateway 105, multiple secure connection links (e.g., multiple secure tunnels that are established over multiple physical links) can be established between one edge node and a gateway.

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, and/or a wireless cellular link (e.g., a 5G LTE network). In some embodiments, the different physical links between the edge node 134 and the cloud gateway 105 are the same type of links (e.g., are different MPLS links).

In some embodiments, one edge forwarding node 130-134 can also have multiple direct links 115 (e.g., secure connection links established through multiple physical links) to another edge forwarding node 130-134, and/or to a datacenter hub node 136. Again, the different links in some embodiments can use different types of physical links or the same type of physical links. Also, in some embodiments, a first edge forwarding node of a first branch site can connect to a second edge forwarding node of a second branch site (1) directly through one or more links 115, or (2) through a cloud gateway or datacenter hub to which the first edge forwarding node connects through two or more links 115. Hence, in some embodiments, a first edge forwarding node (e.g., 134) of a first branch site (e.g., 124) can use multiple SD-WAN links 115 to reach a second edge forwarding node (e.g., 130) of a second branch site (e.g., 120), or a hub forwarding node 136 of a datacenter site 126.

The cloud gateway 105 in some embodiments is used to connect two SD-WAN forwarding nodes 130-136 through at least two secure connection links 115 between the gateway 105 and the two forwarding elements at the two SD-WAN sites (e.g., branch sites 120-124 or datacenter site 126). In some embodiments, the cloud gateway 105 also provides network data from one multi-machine site to another multi-machine site (e.g., provides the accessible subnets of one site to another site). Like the cloud gateway 105, the hub forwarding element 136 of the datacenter 126 in some embodiments can be used to connect two SD-WAN forwarding nodes 130-134 of two branch sites through at least two secure connection links 115 between the hub 136 and the two forwarding elements at the two branch sites 120-124.

In some embodiments, each secure connection link between two SD-WAN forwarding nodes (i.e., CGW 105 and edge forwarding nodes 130-136) is formed as a VPN (virtual private network) tunnel between the two forwarding nodes. In this example, the collection of the SD-WAN forwarding nodes (e.g., forwarding elements 130-136 and cloud gateway 105) and the secure connections between the forwarding nodes forms the virtual network 100 for the particular entity that spans at least public or private cloud datacenter 110 to connect the branch and datacenter sites 120-126.

In some embodiments, secure connection links are defined between gateways in different public cloud datacenters to allow paths through the virtual network to traverse from one public cloud datacenter to another, while no such links are defined in other embodiments. Also, in some embodiments, the cloud gateway 105 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate data message flows that it receives from edge forwarding elements of one entity from data message flows that it receives along other tunnels of other entities. In other embodiments, gateways are single-tenant and are specifically deployed to be used by just one entity.

FIG. 1 illustrates a cluster of controllers 140 that serves as a central point for managing (e.g., defining and modifying) configuration data that is provided to the edge nodes and/or gateways to configure some or all of the operations. In some embodiments, this controller cluster 140 is in one or more public cloud datacenters, while in other embodiments it is in one or more private datacenters. In some embodiments, the controller cluster 140 has a set of manager servers that define and modify the configuration data, and a set of controller servers that distribute the configuration data to the edge forwarding elements (FEs), hubs and/or gateways. In some embodiments, the controller cluster 140 directs edge forwarding elements and hubs to use certain gateways (i.e., assigns a gateway to the edge forwarding elements and hubs). The controller cluster 140 also provides next hop forwarding rules in some embodiments.

Figure 2:
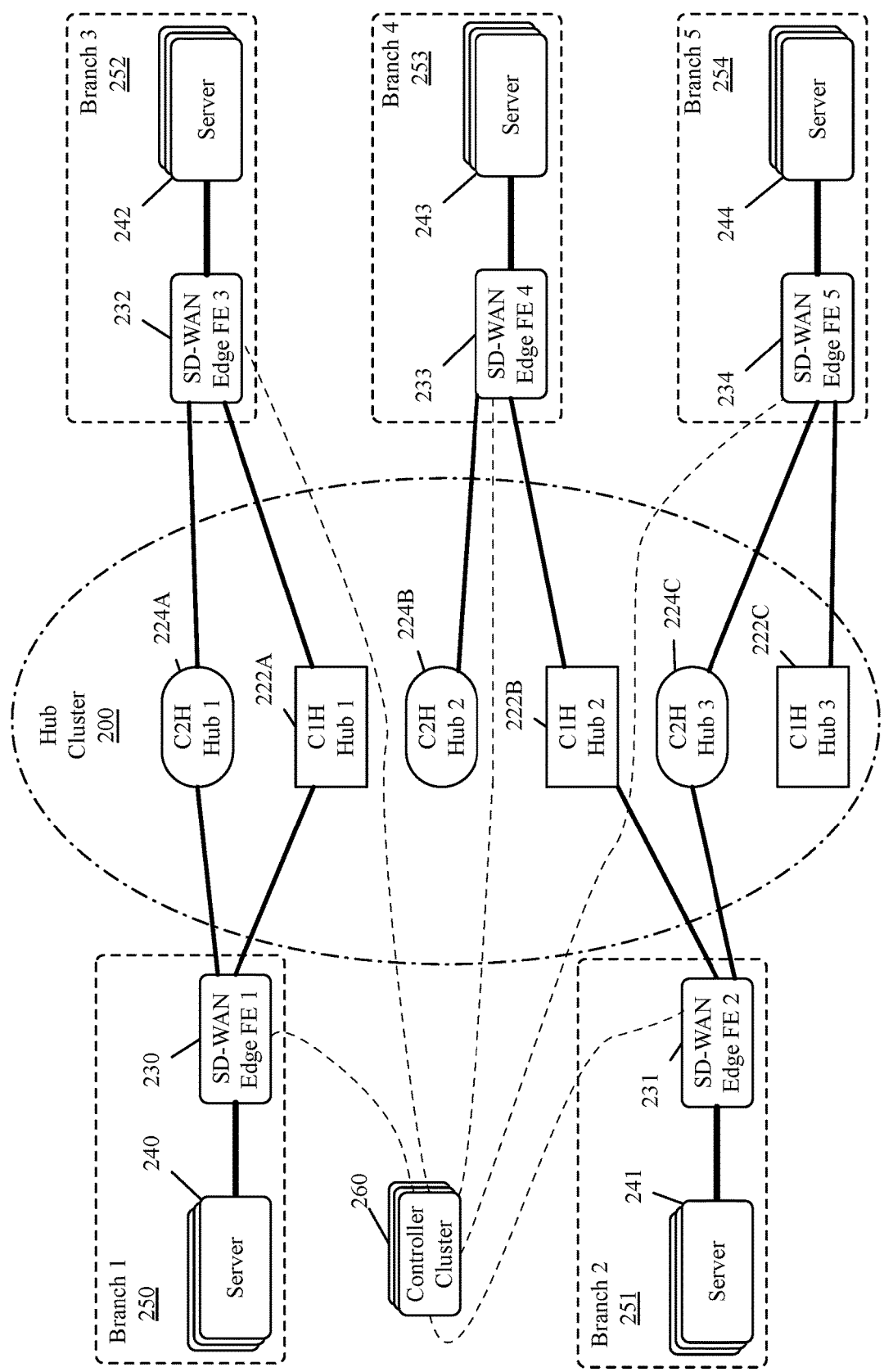
FIG. 2 illustrates a hub cluster of some embodiments with two different categories of hubs.

FIG. 2 illustrates a hub cluster 200 of some embodiments with two different categories of hubs. The hub cluster 200 is a logical group of SD-WAN hubs including hubs of a first category 222A-222C, hubs of a second category 224A-224C, branches 250-254, and controller cluster 260. Each of the hubs in the first category 222A-222C have the same amounts of resources allocated to them as every other hub in the first category (e.g., identical or effectively identical CPU resources, memory resources (RAM resources), disk resources, network bandwidth resources, etc.). For identification, each hub in the first category is labeled with C1H (category 1 hub). The hubs of the second category 222A-222C each have different resources from the hubs in the first category. For identification, each hub in the second category is labeled with C2H (category 2 hub). In some embodiments, each hub in the second category 222A-222C has identical or effectively identical amounts of resources allocated to it as each other hub in the second category 222A-222C. In other embodiments, different hubs in the second category 222A-222C have different amounts of resources allocated to it as each other hub in the second category 222A-222C. In some such embodiments, every hub in the second category may have a different amount of resources than every other hub in the second category, while in other such embodiments hubs in the second category are in multiple sub-categories, with each sub-category including hubs with the same allocated resources as other hubs in that sub-category.

Each of the branches 250-254 is assigned to one hub of the first category 222A, 222B, or 222C and one hub of the second category 224A-224C. As illustrated, in some embodiments, two branches 250-254 may both be assigned to the same pair of hubs, to a common hub of the first category, to a common hub of the second category, or to different hubs.

Hubs of the first category 222A-222C are physical or virtual hubs, each built or provisioned with the same or equivalent resources. That is, the resources, including at least the processing units (CPUs, etc.), memory (physical and/or allocated), and networking capabilities (physical or virtual) of each of the hubs of the first category 222A-222C are the same as each of the other hubs of the first category 222A-222C, in some embodiments. An advantage to having a first category of hubs with matching resources is that hubs of that category can be used interchangeably, with a new hub smoothly replacing a malfunctioning, or otherwise disabled hub.

There are also advantages to using hubs of a second category, with different resources, in conjunction with the hubs of the first category. Larger amounts of resources generally cost extra to deploy or may not be available to be deploy at all given available resources of a cloud provider. Therefore, when there are operations of a secondary hub (of a branch) that can be performed by a hub of the second category with fewer resources than one of the hubs of the first category, it is more efficient to deploy a hub of the second category than an additional hub of the first category. For example, in embodiments in which hubs are deployed on a cloud supplied by a cloud provider, resources will be limited to what the cloud provider is willing and able to supply.

A hub cluster 200 with both hubs of the first category 222A-222C and hubs of the second category 224A-224C can have resource policies defined for the standard first category of hubs deployments with the right sizing of CPU/Memory/Disk/Network for the typical load that the branches 250-254 place upon the hubs of first category 222A-222C. However, when there are burst traffic scenarios that end up overflowing the standard hubs of the first category 222A-222C resources, then the spill over traffic can be handled by the light weight (i.e., lower resource) hubs of the second category 224A-224C. For example, in some embodiments, hubs of the second category 224A-224C consume less resources (e.g., say 50%-75% of CPU/ Memory sizing as that of hubs of the first category 222A-222C) and effectively save costs (versus deployments with two full hubs of the first category assigned to each branch). However, while saving costs and using fewer resources, the additional hubs of the second category still increase availability & resiliency of hub cluster service on the cloud points of presence (PoPs).

SD-WAN edges 230 and 232 of branches 250 and 252, respectively are each connected through VPN tunnels to hubs 224A and 222A. SD-WAN edge 231 of branch 251 is connected through VPN tunnels to hubs 224C and 222B. SD-WAN edge 233 of branch 253 is connected through VPN tunnels to hubs 224B and 222B. SD-WAN edge 234 of branch 254 is connected through VPN tunnels to hubs 224C and 222C.

The SD-WAN edges 230-234 are connected to servers 240-244, respectively. In some embodiments, the connections between the gateways 230-234 and the servers 240-244 are also over VPN tunnels. In other embodiments, other security methods are used to protect the connections between the gateways 230-234 and the servers 240-244. In some embodiments, hubs of a hub cluster are also connected to other hubs of the cluster through VPN tunnels.

The servers 240-244 of some embodiments may implement machines or devices of the networks such as virtual machines or containers. Similarly, the servers 240-244 may connect to host machines that implement such virtual machines or containers. Data messages referred to herein as coming from or passing through a branch or hub may be sent from and/or be sent to a VM on a host machine connected to the servers of a branch or a VM implemented by servers of a branch such as the servers 240-244. The servers 240-244 may execute applications that send network traffic (e.g., data packets) through the hub cluster 200 to other branches or through other network connections (not shown) to locations outside the SD-WAN.

The hub cluster 200 is deployed in so that the hub nodes span across different server racks, different buildings, different regions and/or different cloud. By deploying hubs in different locations and/or different clouds, the system provides increased availability and resiliency. That is, additional hubs allow more branches to be served simultaneously, while the dispersed deployment ensures that if an outage strikes one particular rack, building, region, or cloud, the hub node as a whole will continue to function. In some embodiments, the hub cluster 200 provides horizontal scaling by maintaining hub nodes that are independent of each other.

The controller cluster 260 (sometimes called a "controller" or a "cloud gateway"), in some embodiments, has a holistic view of all hub nodes 224A-222C in the cluster 200 along with the hub nodes' associated CPU, Memory. Network load & routes related metrics. In some embodiments, this holistic view is maintained by communicative connections to the hub nodes 224A-222C themselves. In other embodiments, this holistic view is provided by some intermediary monitor (not shown). Based on the holistic view of the hub cluster 200, the controller cluster 260 manages hub assignments/re-assignments for each of the SD-WAN FEs 230-234. For hub cluster 200, the controller cluster 260 assigns one of the hubs of the first category 222A-222C and one of the hubs of the second category 4A-224C to each SD-WAN FE 230-234.

In some embodiments, based on application specific policies (sometimes called "business policies") for one or more applications operating on one of the branches (for this example, branch 250), the controller cluster advertises two routes to the SD-WAN FE 230 of the branch 250. One of the two routes points to the hub of the first category 222A as a primary route for the application the other route points to the hub of the second category 224A as a secondary route for the application. When the hub of the first category 222A enters overload conditions (e.g., 75% of the maximum traffic threshold of the hub is used), then subsequent application traffic flows switch over instantly to secondary route which points to hub of the second category 224A. That is, the multi-category hub cluster makes use of a software defined routing solution to achieve instant failover and convergence of routes across first and second category hub nodes within hub cluster 200. Such overflow traffic is further described with respect to FIG. 5, below.

Figure 3:
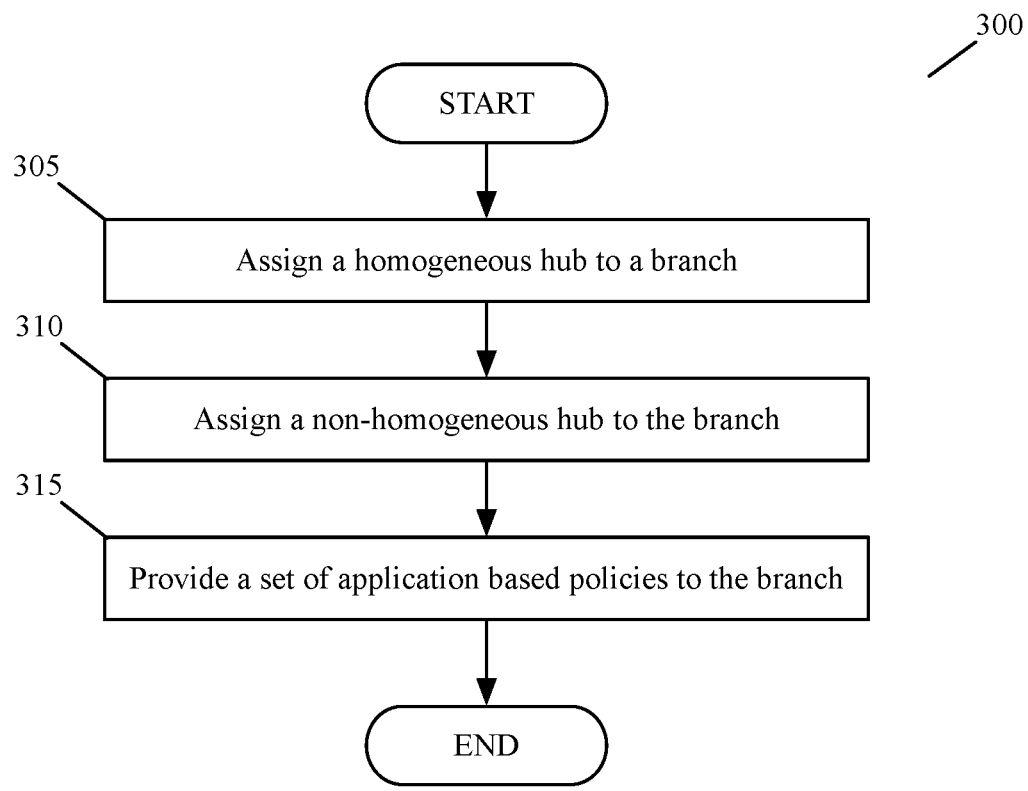
FIG. 3 conceptually illustrates a process of some embodiments for assigning hubs in a hub cluster to a branch.

FIG. 3 conceptually illustrates a process 300 of some embodiments for assigning hubs in a hub cluster to a branch. In some embodiments, these assignments are performed by a gateway such as CGW 105, of FIG. 1. In some embodiments, the CGW 105 makes these assignments as directed by a controller cluster 140. The process 300, of FIG. 3, begins by assigning (at 305) a hub of the first category to a branch. As each of the hubs of the first category is built with, or allocated, equivalent resources, this assignment may be made according to standard load balancing considerations such as the number of branches already assigned to the hub, the networking conditions (e.g., bandwidth, signal quality, ping time, etc.) between the branch and the hub.

The process 300 then assigns (at 310) a hub of the second category to the branch. In some embodiments, although the hubs of the second category have different resources from the hubs of the first category, each heterogeneous hub has the same resources as each other heterogeneous hub. In such embodiments, as each of the heterogeneous hubs is built or allocated equivalent resources, the assignment of the heterogeneous hubs may also be made according to standard load balancing considerations such as the number of branches already assigned to the hub, the networking conditions (e.g., bandwidth, signal quality, ping time, etc.) between the branch and the hub.

The process 300 then provides (at 315) a set of application based policies to the branch. The set of application based polices includes at least one policy that defines, for at an application that will be (or might be) executed on the branch, how network traffic will be allocated between the hub of the first category and the heterogeneous hub. In some embodiments, the different kinds of traffic may have different destinations. In some embodiments, the different kinds of traffic may be traffic with a volume that the hub of the first category can handle, and traffic that overloads the hub of the first category. FIGS. 4 and 5 illustrate examples of network traffic routed according to an application based policy.

Figure 4A:
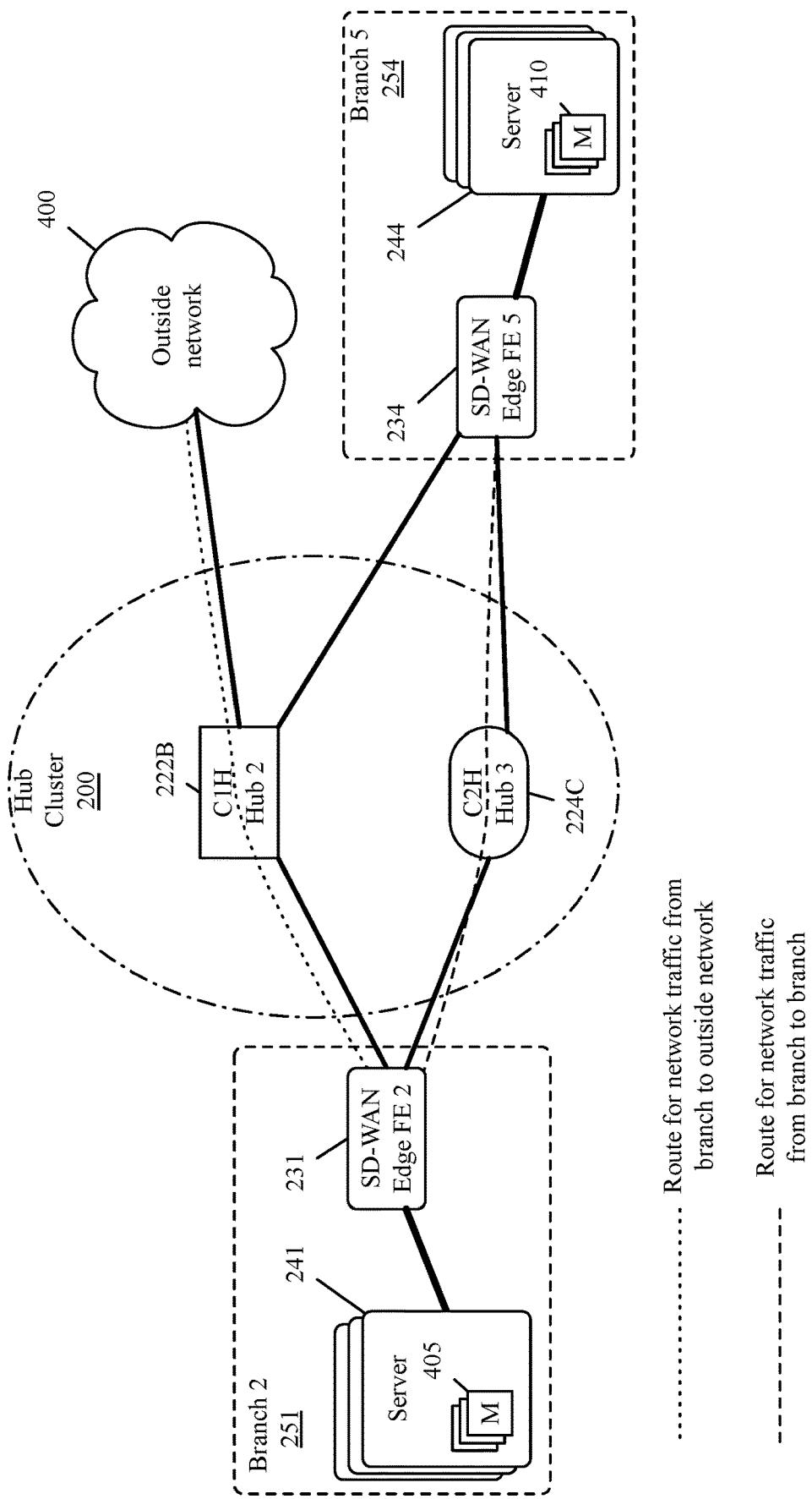
FIG. 4A illustrates network traffic routed through different hubs based on destination of the traffic.
Figure 5:
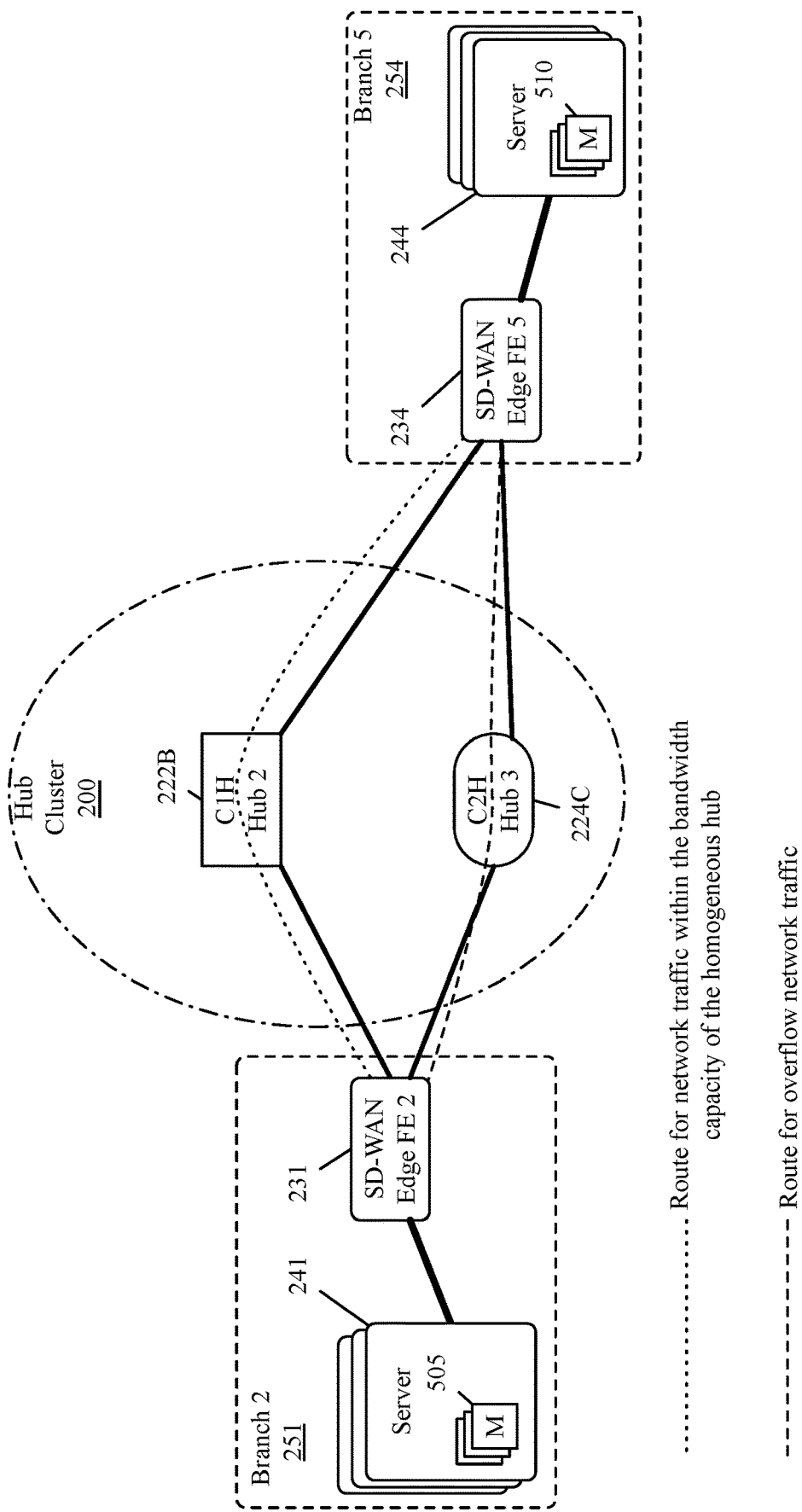
FIG. 5 illustrates network traffic routed through different hubs based on whether the traffic is within the bandwidth capacity of the primary hub or is overflow traffic.

FIG. 4A illustrates network traffic routed through different hubs based on destination of the traffic. FIG. 4A includes outside network 400 and machines 405 and 410. The machines 405 are implemented by servers 241 on branch 251. The machines 405 implement applications (not shown) that generate network traffic sent to either the outside network 400 or to machines 410 implemented by servers 244 on branch 254. The routing of the network traffic is based on an application based policy (e.g., implemented by the edge 231). According to the policy, traffic from branch 251 to branch 254 is sent through heterogeneous hub 224C and traffic from branch 251 to the outside network 400 is sent through hub of the first category 222B.

Figure 4B:
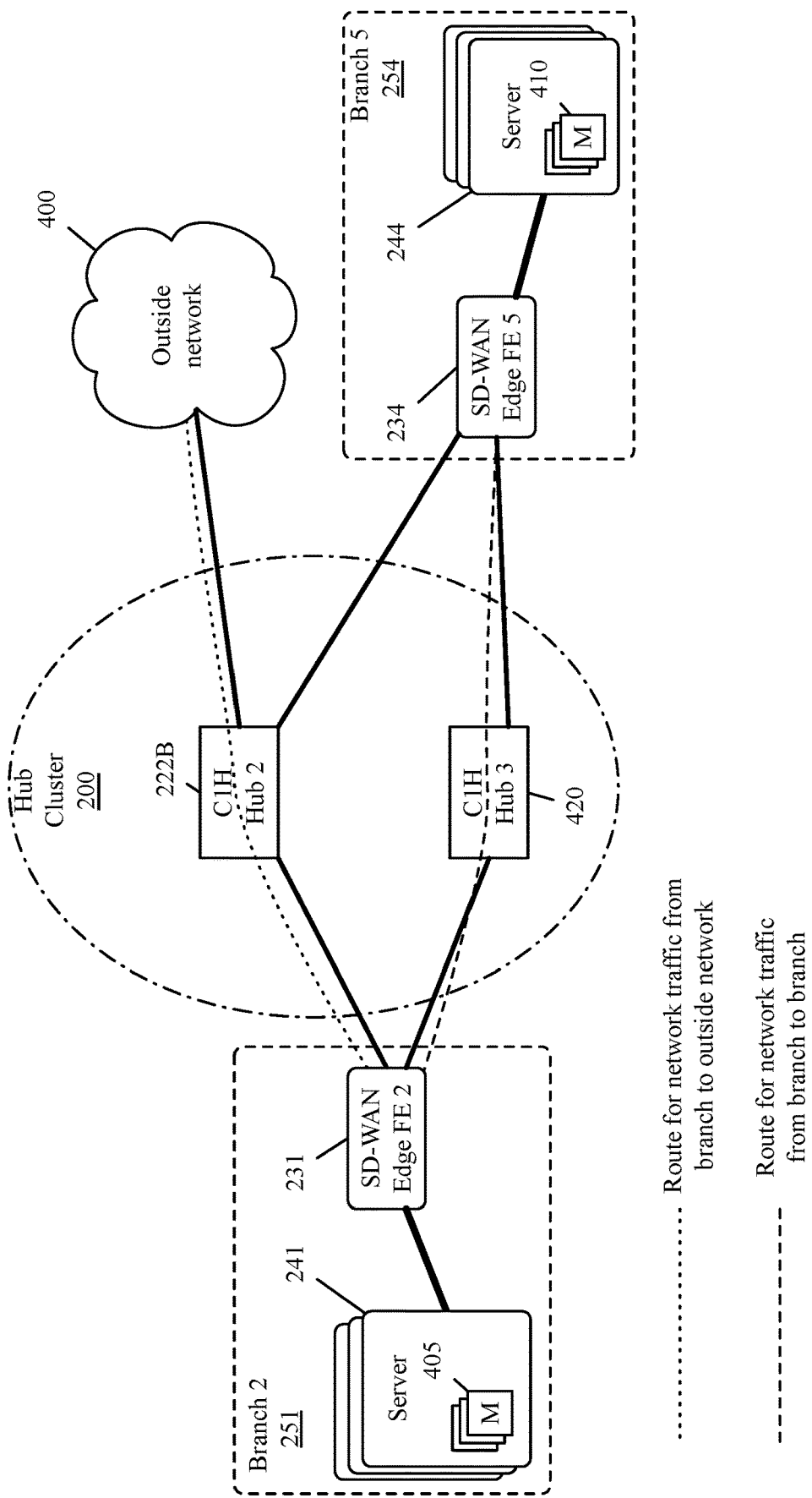
FIG. 4B illustrates an embodiment in which a dedicated hub of a different category from the primary hub is assigned to handle branch-to-branch traffic.

Although the embodiment of FIG. 4A routes the branch-to-branch traffic through a dedicated heterogeneous hub 224C, one of ordinary skill in the art will understand that in some embodiments, branch-to-branch traffic can be routed through a dedicated hub of the first category rather than a heterogeneous hub. FIG. 4B illustrates an embodiment in which a dedicated hub of the first category 420 is assigned to handle branch-to-branch traffic. In FIG. 4B, hub 222B handles any traffic to and from the outside network (e.g., to machines, computers, etc. outside of the SD-WAN network).

In some embodiments, a particular hub is assigned entirely to branch-to-branch traffic, and may connect traffic between any of several branches (a many branches to/from many branches configuration). In other embodiments, a particular hub may be assigned to branch-to-branch traffic between a specific branch and any other branches sending traffic to or from the specific branch (a one branch to/from many branches configuration). In still other embodiments, a particular hub may be assigned to branch-to-branch traffic from a first specific branch to a second specific branch (a one branch to/from one branch configuration). Additionally, a hub that is assigned to carry, for a specific branch, only branch-to-branch traffic, may be assigned to carry, for a different branch, traffic to machines/computers outside the network. That is, for a first branch the hub is branch-to-branch only, but for a second branch, the hub is either not dedicated or is dedicated to traffic from the second branch to outside machines/computers.

FIG. 5 illustrates network traffic routed through different hubs based on whether the traffic is within the bandwidth capacity of the hub of the first category 222B or is overflow traffic. FIG. 5 includes machines 505 and 510. The machines 505 are implemented by servers 241 on branch 251. The machines 505 implement an application (not shown) that requires seamless connectivity. The application generates network traffic sent to machines 510 implemented by servers 244 on branch 254 (e.g., machines acting as application servers). The routing of the network traffic for that application is determined according to an application based policy (e.g., implemented by the edge 231). According to the policy, traffic from the branch 251 to the machines 510 on branch 254 is sent through hub of the first category 222B so long as that traffic is not overloading (e.g., exceeding the bandwidth of) the hub of the first category 222B. Traffic from that application that would overload the hub of the first category 222B is routed instead through heterogeneous hub 224C.

By established VPN tunnels between the branch 251 and two hubs 222B and 224C, the present invention allows overflow traffic from the application to be re-routed through the heterogeneous hub 224C without the brief traffic outage that would be required to establish a new VPN tunnel in a prior art system in which each branch is assigned to a single hub at a time. One of ordinary skill in the art will understand that traffic from a particular application executing on branch 251 may overload the hub of the first category solely based on the volume of traffic from the application, or based on additional traffic from other applications executing on branch 251, or based on additional traffic from other branches (e.g., 254, or other branches, not shown, assigned to hub 222B. One of ordinary skill in the art will also understand that in some embodiments, rather than offloading a portion of the traffic from hub 222B when the bandwidth of hub 222B is exceeded, the edge 231 will switch all the traffic from the application to the route through hub 224C.

Figure 6:
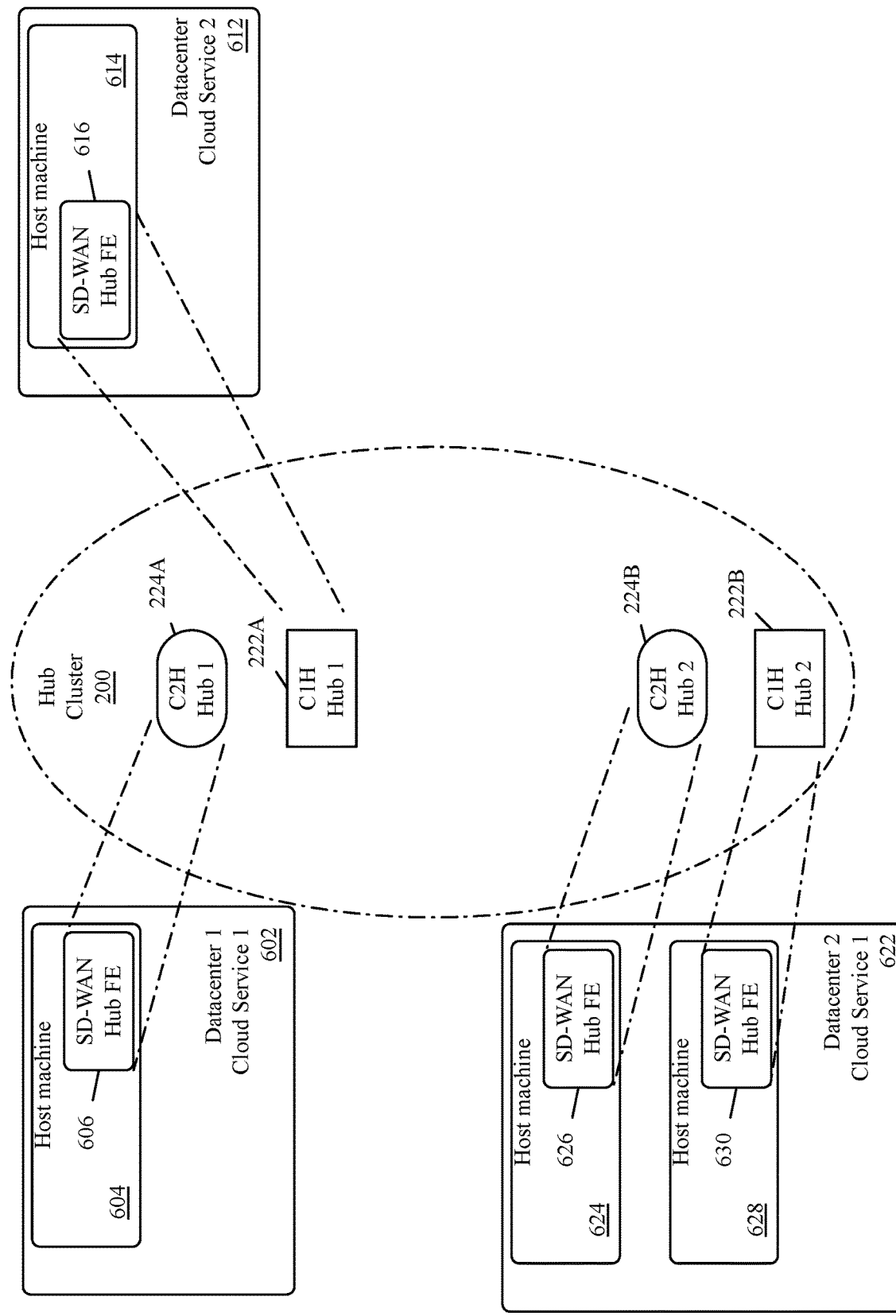
FIG. 6 illustrates a deployment of a virtual hub cluster including hub nodes of two different cloud services.

An additional method of handling network traffic that may be implemented in conjunction with the multi-category hub cluster and may alternately be implemented in a cluster with all hubs having the same resources as each other is a method of deploying a virtual hub cluster (in a logical network) with nodes from two different cloud services. FIG. 6 illustrates a deployment of a virtual hub cluster 200 including hub nodes of two different cloud services. FIG. 6 includes datacenters 602, 612, and 622. Datacenters 602 and 622 are datacenters of a first cloud service (e.g., Amazon web services (AWS)). Datacenter 612 is a datacenter of a second cloud service (e.g., Microsoft Azure). Each datacenter implements at least one host machine, host machine 604 in datacenter 602, host machine 614 in datacenter 612, and host machines 624 and 628 in datacenter 622. The hub nodes 224A, 222A, 224B, and 222B in the hub cluster 200 are implemented by (respectively) SD-WAN hub nodes 606, 616, 626, and 630 on host machines 606, 614, 624, and 626.

Any of the host machines of a particular cloud service may be on the same racks, different racks in the same building, in different buildings, or in different geographical regions (e.g., different towns, cities, states, countries, continents, etc.). Any of the host machines of different cloud services may be in different racks in the same building, different buildings, or different geographical regions. In some embodiments, the host machines of the different cloud services may be selected based on their proximity to each other. For example, the host machines on which the hubs are implemented may be selected because they are in close proximity, (e.g., in two buildings in the same city, even though each building houses a datacenter run by a different cloud service). Although FIG. 6 shows two different cloud services, in some embodiments, any number of hub nodes may be implemented by any number of different cloud services (e.g., 2, 3, 4, etc.).

Figure 7:
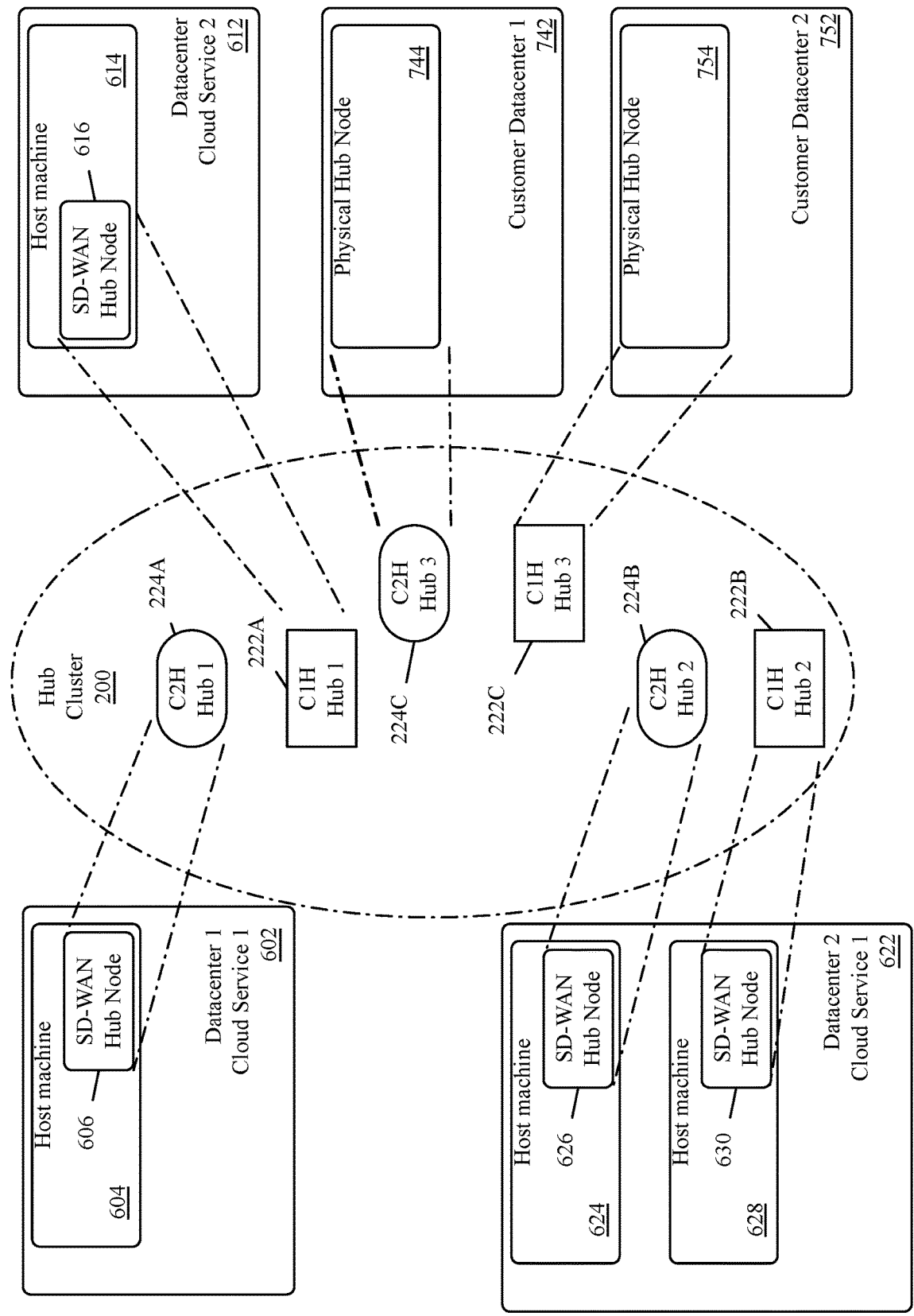
FIG. 7 illustrates a deployment of a virtual hub cluster including hub nodes of two different cloud services and physical hubs of two datacenters.

FIG. 7 illustrates a deployment of a virtual hub cluster 200 including hub nodes of two different cloud services and physical hubs of two datacenters. In FIG. 7, the hub cluster 200 has two additional hubs 224C and 222C provided by physical hub nodes 744 (in datacenter 742) and physical hub node 754 (in datacenter 752), respectively. The datacenters 742 and 752 are not part of either cloud service, but are controlled by either the same administrative entity as the logical network by one or more cloud companies, or by some other third-party/parties. The virtual hub cluster 200 acts as a single hub cluster of the logical network (e.g., the SD-WAN). The datacenters 742 and 752 may be in the same geographical region or different geographical regions. Although in the embodiment of FIG. 7, the physical hubs 744 and 754 are in different datacenters, in other embodiments multiple physical and/or virtual hubs may be in a single datacenter.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
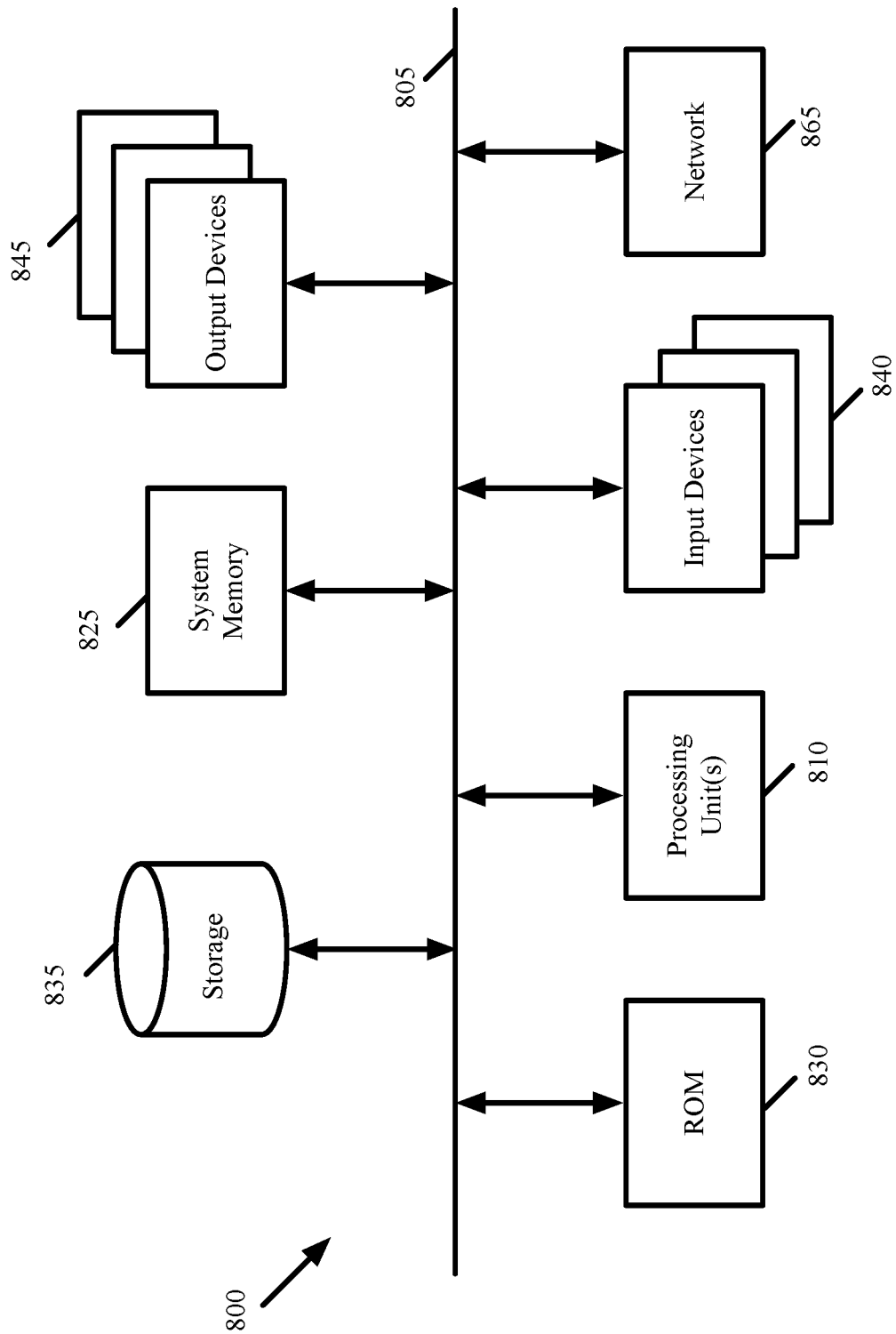
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, gateway and edge forwarding elements. As such, it can be used to execute any of the above-described processes. This computer system 800 includes various types of non-transitory machine-readable media and interfaces for various other types of machine-readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device 835. Like the permanent storage device 835, the system memory 825 is a read-and-write memory device. However, unlike storage device 835, the system memory 825 is a volatile read-and-write memory, such as random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices 840 enable the user to communicate information and select commands to the computer system 800. The input devices 840 include alphanumeric keyboards and pointing devices (also called "cursor control devices"). The output devices 845 display images generated by the computer system 800. The output devices 845 include printers and display devices, such as cathode ray tubes (CRT) or liquid crystal displays (LCD). Some embodiments include devices such as touchscreens that function as both input and output devices 840 and 845.

Finally, as shown in FIG. 8, bus 805 also couples computer system 800 to a network 865 through a network adapter (not shown). In this manner, the computer 800 can be a part of a network of computers (such as a local area network ("LAN"), a wide area network ("WAN"), or an Intranet), or a network of networks (such as the Internet). Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of transmitting data, the method comprising:
for each of a plurality of branches of a logical network which further includes a hub cluster having a plurality of hubs of a first category of hubs and a plurality of hubs of a second category of hubs:

assigning a first hub of the first category of hubs to the branch;
assigning a second hub of the second category of hubs to the branch; and
providing a set of application based policies to the branch, the application based policies directing the branch to route different types of network traffic of the application through the first hub than through the second hub;
wherein each hub of the first category of hubs comprises a set of resources equivalent to a set of resources of each other hub of the first category of hubs; and
wherein each hub of the second category of hubs comprises a set of resources that is not equivalent to the set of resources of each hub of the first category of hubs.

2. The method of claim 1, wherein the second category of hubs comprises a plurality of sub-categories of hubs, each hub in a sub-category of hubs comprising an equivalent set of resources to each other hub of the sub-category of hubs, the branch is a first branch, and the second hub is a hub of a first sub-category, the method further comprising assigning a third hub of the first category of hubs and a fourth hub of a second sub-category of hubs to a second branch.

3. The method of claim 1, wherein each hub of the second category of hubs comprises a set of resources that is equivalent to a set of resources of each other hub of the second category of hubs.

4. The method of claim 1, wherein the set of resources of each hub of the first category of hubs includes at least an equivalent amount of processing resources and an equivalent amount of memory.

5. The method of claim 4, wherein the set of resources of each hub of the first category of hubs further includes at least equivalent network resource characteristics and equivalent storage capacity.

6. The method of claim 1, wherein each hub of the first category of hubs has at least one resource that is superior to the hubs of a corresponding resource of the second category of hubs.

7. The method of claim 1, wherein the hubs of the first category of hubs carry higher priority network traffic than the hubs of the second category of hubs.

8. The method of claim 1, wherein an application based policy for a particular application routes at least part of the network traffic of the particular application through the second hub when the first hub is overloaded.

9. The method of claim 1, wherein an application based policy for a particular application directs network traffic of the particular application sent from a first branch to a destination at a second branch through the second hub and directs network traffic sent from the first branch to a destination outside the logical network through the first hub.

10. The method of claim 1, wherein an application based policy for a particular application directs the branch to set a lower priority for sending network traffic with a subset of route prefixes through the first hub and directs the branch to set a higher priority for sending network traffic with the subset of route prefixes through the second hub.

11. The method of claim 1, wherein providing a set of application based policies to the branch comprises providing the set of application based policies to an SD-WAN edge of the branch.

12. The method of claim 1, wherein the assigning and providing is performed through a cloud gateway.

13. A method of transmitting data, comprising:
establishing connections with a plurality of branches of a logical network which further includes a hub cluster having a plurality of hubs of a first category of hubs and a plurality of hubs of a second category of hubs; and for each of the plurality of branches and via the connections:
assigning a first hub of the first category of hubs to forward data from the assigned branch to machines outside of the logical network; and
assigning a second hub of the second category of hubs to forward data from the assigned branch to other branches of the logical network;

wherein each hub of the first category of hubs comprises a set of resources equivalent to a set of resources of each other hub of the first category of hubs; and wherein each hub of the second category of hubs comprises a set of resources that is not equivalent to the set of resources of each hub of the first category of hubs.

14. The method of claim 13, wherein the second hub is assigned to forward data exclusively between branches of the logical network.

15. The method of claim 13, wherein the assigned branch is a first assigned branch and the second hub is assigned to forward data exclusively between the first assigned branch and a second assigned branch of the logical network.

16. The method of claim 13, wherein the assigned branch is a first assigned branch and the second hub is further assigned to forward data from other assigned branches of the logical network, but not the first assigned branch, to the machines outside of the logical network.

17. A method of transmitting data, the method comprising:
assigning first hubs to branches of a logical network;
assigning second hubs to the branches of the logical network; and
providing application based policies to the branches of the logical network to direct the branches to route a first type of traffic through the first hubs and a second type of traffic, which is different from the first type of traffic, through the second hubs;
wherein the logical network includes the first hubs and the second hubs;
wherein the first hubs include equivalent amounts of resources; and
wherein the second hubs include amounts of resources which are different from the equivalent amounts of resources of the first hubs.

18. The method of claim 17, wherein the second hubs include:
a first group of second hubs having first-group equivalent amounts of resources which are different from the equivalent amounts of resources of the first hubs; and
a second group of second hubs having second-group equivalent amounts of resources which are different from the equivalent amounts of resources of the first hubs and which are further different from the first-group equivalent amounts of resources; and
wherein assigning the second hubs to the branches of the logical network include:
assigning a second hub of the first group of second hubs to a first branch of the logical network; and
assigning a second hub of the second group of second hubs to a second branch of the logical network.

19. The method of claim 17, wherein providing the application based policies to the branches of the logical network includes:
directing at least some of the branches to route normal load traffic through the first hubs and spillover load traffic through the second hubs.

* * * * *